(12) United States Patent
Brunswig et al.

(10) Patent No.: US 9,053,445 B2
(45) Date of Patent: Jun. 9, 2015

(54) MANAGING BUSINESS OBJECTS (71) Applicants: Frank Brunswig, Heidelberg (DE); Dirk Giebel, Walldorf (DE); Ralph Rillig, Mutterstadt (DE); Jens Weiler, Weingarten (DE); Michael Hartel, Heidelberg (DE); Daniel Zoch, Walldorf (DE); Gerd Ritter, Heidelberg (DE)

(72) Inventors: Frank Brunswig, Heidelberg (DE); Dirk Giebel, Walldorf (DE); Ralph Rillig, Mutterstadt (DE); Jens Weiler, Weingarten (DE); Michael Hartel, Heidelberg (DE); Daniel Zoch, Walldorf (DE); Gerd Ritter, Heidelberg (DE)

(73) Assignee: SAP SE, Walldorf (DE)

( * ) Notice: Subject to any disclaimer, the term of this patent is extended or adjusted under 35 U.S.C. 154(b) by 369 days.

(21) Appl. No.: 13/705,534

(22) Filed: Dec. 5, 2012

(65) Prior Publication Data
US 2014/0157154 A1 Jun. 5, 2014

(51) Int. Cl.
*G06F 3/00* (2006.01)
*G06Q 10/06* (2012.01)

(52) U.S. Cl.
CPC .................................. *G06Q 10/06* (2013.01)

(58) Field of Classification Search
CPC ..... G06F 3/048; G06F 3/0481; G06F 3/0482; G06F 8/71; G06F 17/30
See application file for complete search history.

(56) References Cited

U.S. PATENT DOCUMENTS

| 8,892,545 | B2 * | 11/2014 | Kazmaier et al. | 707/722 |
| 2013/0174181 | A1 * | 7/2013 | Jentsch et al. | 719/328 |
| 2014/0164411 | A1 * | 6/2014 | Thimmel et al. | 707/756 |

* cited by examiner

*Primary Examiner* — Rashawn Tillery
(74) *Attorney, Agent, or Firm* — Brake Hughes Bellermann LLP (57) ABSTRACT

In accordance with aspects of the disclosure, a system and methods are provided for managing business objects in memory. The system and methods may be provided for defining a context of one or more input parameters of data used to determine one or more properties of one or more business objects, defining one or more rules associated with the one or more properties of each business object, and generating a metadata model for each business object based on the context of the one or more input parameters of each business object and the one or more rules associated with the one or more properties of each business object.

24 Claims, 8 Drawing Sheets

MANAGING BUSINESS OBJECTS

TECHNICAL FIELD

The present description relates to computer-based techniques and methods for managing business objects.

BACKGROUND

Software application and development environments based on business objects provide for ease of development and use of related software applications. For instance, business objects may be used to encapsulate defined attributes, values, and associated data, as well as related logic and/or associated behaviors. Thus, a business object may correspond to, or represent, a specific technical, semantic, and/or tangible entity that is known to have certain properties and capabilities, and may interact with other business objects representing corresponding entities to thereby collectively provide a desired functionality. Due to their modular properties and other known aspects, business objects may enable fast, convenient development of highly customized software applications that are straightforward for a developer to implement, and likely to fulfill needs and requirements of consumers or other users thereof.

In conventional environments, properties for business objects are typically determined only by instantiating a service provider, where property determination is a coded application specific to the particular service provider. Since these properties are typically characterized by fixed conditions, it may not be known which data is required for property determination and how properties are calculated based on this data. As such, there currently exists a need to improve the management of business object properties where central improvements, maintenance, and reuse is possible.

SUMMARY

In accordance with aspects of the disclosure, a computer system may be provided for managing business objects including instructions recorded on a computer-readable medium and executable by at least one processor. The computer system may include an access manager configured to cause the at least one processor to manage business objects in memory by determining one or more properties of each business object, displaying each business object in a configuration table of a user interface, and configuring the user interface to map user interface (UI) fields in reference to defining the one or more properties of each business object. The access manager may include a context handler configured to define a context of one or more input parameters of data used to determine the one or more properties of each business object, a rule handler configured to define one or more rules associated with the one or more properties of each business object, and a model handler configured to generate a metadata model for each business object based on the context of the one or more input parameters of each business object and the one or more rules associated with the one or more properties of each business object. The access manager may include a runtime handler configured to lock the one or more properties of each business object to each corresponding metadata model and a property calculation handler configured to map each property for each business object in memory to at least one of the UI fields in reference to defining the one or more properties associated with each business object.

In accordance with aspects of the disclosure, a computer-implemented method may be provided for managing business objects in memory. The computer-implemented method may include determining one or more properties of each business object, displaying each business object in a configuration table of a user interface, and configuring the user interface to map UI fields in reference to defining the one or more properties of each business object. The computer-implemented method may include defining a context of one or more input parameters of data used to determine the one or more properties of each business object, defining one or more rules associated with the one or more properties of each business object, generating a metadata model for each business object based on the context of the one or more input parameters of each business object and the one or more rules associated with the one or more properties of each business object. The computer-implemented method may include locking the one or more properties of each business object to each corresponding metadata model and mapping each property for each business object in memory to at least one of the UI fields in reference to defining the one or more properties associated with each business object.

In accordance with aspects of the disclosure, a computer program product may be provided, wherein the computer program product is tangibly embodied on a computer-readable storage medium and includes instructions that, when executed by at least one processor, are configured to manage business objects in memory by determining one or more properties of each business object, displaying each business object in a configuration table of a user interface, and configuring the user interface to map UI fields in reference to defining the one or more properties of each business object. The instructions, when executed by the at least one processor, may be configured to define a context of one or more input parameters of data used to determine the one or more properties of each business object, define one or more rules associated with the one or more properties of each business object, and generate a metadata model for each business object based on the context of the one or more input parameters of each business object and the one or more rules associated with the one or more properties of each business object. The instructions, when executed by the at least one processor, may be configured to lock the one or more properties of each business object to each corresponding metadata model and map each property for each business object in memory to at least one of the UI fields in reference to defining the one or more properties associated with each business object.

As provided herein, details of one or more implementations are set forth in the accompanying drawings and the description below. Other features will be apparent from the description and drawings, and from the claims.

DETAILED DESCRIPTION

Figure 1:
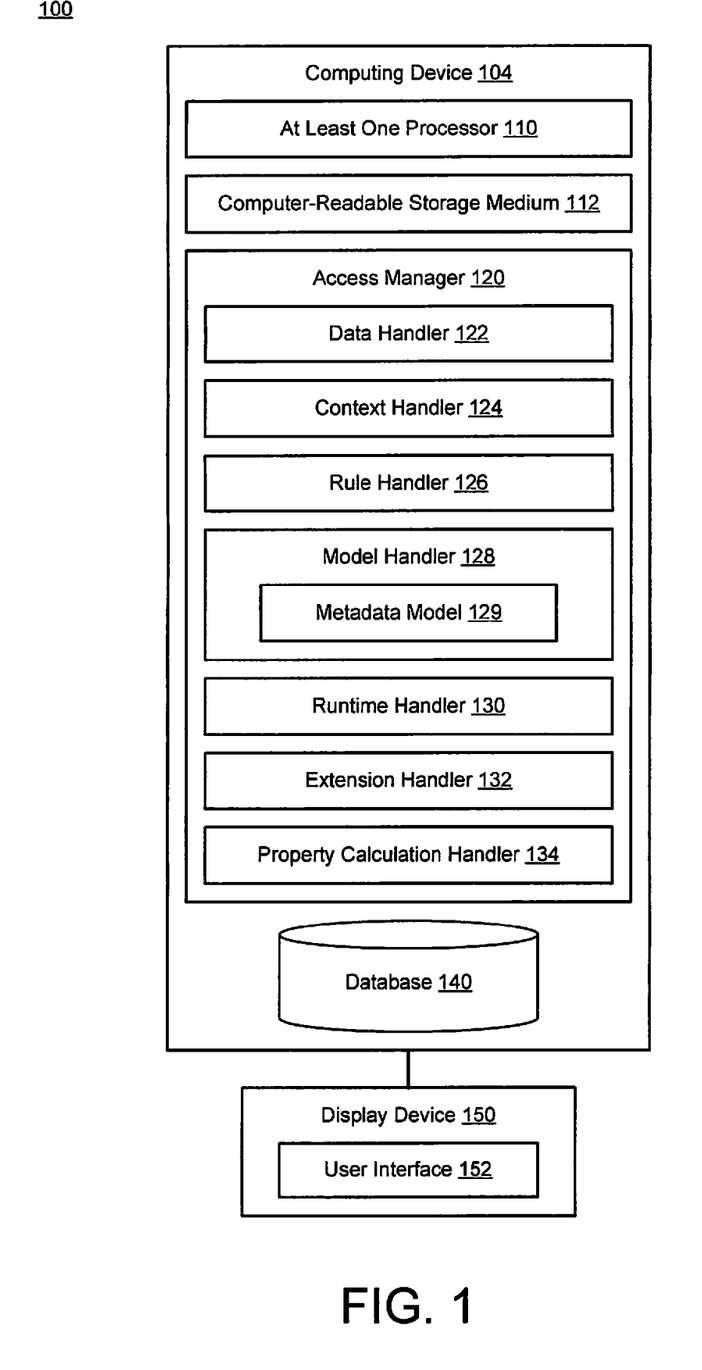
FIG. 1 is a block diagram illustrating an example system for managing business objects, in accordance with aspects of the disclosure.

FIG. 1 is a block diagram illustrating an example system 100 for managing business objects, in accordance with aspects of the disclosure.

In the example of FIG. 1, the system 100 comprises a computer system for implementing a business object (BO) management system that may be associated with a computing device 104, thereby transforming the computing device 104 into a special purpose machine designed to determine and implement the technique(s), method(s), and process(es), as described herein. In this sense, it may be appreciated that the computing device 104 may include any standard element(s), including at least one processor(s) 110, memory 112 (e.g., a non-transitory computer-readable medium), power, peripherals, and various other computing elements not specifically shown in FIG. 1. Further, the system 100 may be associated with a display device 150 (e.g., a monitor or other display) that may be used to provide a user interface (UI) 152, such as, for example, a graphical user interface (GUI). In an implementation, the UI 152 may be used to receive preferences from a user for managing or utilizing the system 100. For example, the UI 152 may be configured to map user interface (UI) fields in reference to defining one or more properties of business objects, wherein business objects may be displayed in a configuration table of the UI 152. In another example, the UI 152 may be configured to receive user input selections in reference to defining one or more properties of business objects, wherein business objects may be displayed in a configuration table of the UI 152. It should be appreciated that various other elements of the system 100 that may be useful for implementing the system 100 may be added or included, as would be apparent to one of ordinary skill in the art.

In accordance with aspects of the disclosure, the term 'business object' may be understood to represent, virtually any software object that seeks to encapsulate data and associated methods, and which represent an entity within a modular software development environment. Generally, such software objects may be known by many different nomenclatures and terminologies, and may include, for example, enterprise java beans (EJBs), advanced business application programming (ABAP) objects, business objects, and/or variations thereof.

In some examples, references are made primarily to business objects in corporate or enterprise settings. However, it should be appreciated that the term business should be understood to represent virtually any profit related activities associated with a legal entity, as well as various not-for-profit entities, such as, for example, schools, governmental entities, charitable entities, the military, or any other entity which may benefit from the modular software development techniques described herein.

In an aspect of the disclosure, the business object based application environment may be associated with a number of developmental entities and associated development tools that are designed to allow developers to generate functionalities and results using existing business objects. For instance, developmental tools may include tools for generating a user interface including a graphical user interface (GUI) based on one or more business objects, and/or may include report generation tools that enable business objects to generate reports and other analyses of data included in, or associated with, one or more business objects. Such developmental tools including other features and functions of a business object based application environment illustrate, for example, the nature and extent of interoperability between business objects, as well as the ease and flexibility of use of the business objects in obtaining a desired result.

In another aspect of the disclosure, one or more external applications may be configured to execute on remote servers that are in communication with the business object based application environment via an appropriate computer network (e.g., the Internet). Such applications may be configured to provide features and functionalities that may be useful or advantageous to a developer utilizing a business object based application environment. The application may expose some or all of its features and functionalities using a web service, which may utilize a number of known formats, techniques, and associated protocols for exposing the features and functionalities of the application in a discoverable manner. The web service may be exposed in a manner which provides for ease of interaction between the web service and other web services, or other application interfaces which are designed to be interoperable with the web service.

In reference to the example of FIG. 1, the business object management system 100 may include the computing device 104 and instructions recorded on the computer-readable medium 112 and executable by the at least one processor 110. The business object management system 100 may include the display device 150 for providing output to a user, and the display device 150 may include the UI 152 (e.g., GUI) for receiving input selections from the user.

The business object management system 100 may include an access manager 120 configured to cause the at least one processor 110 to manage business objects in memory (e.g., a metadata repository stored in the computer-readable storage medium 112 or a database 140) by determining one or more properties of each business object, displaying each business object in a configuration table of a user interface (e.g., UI 152), and configuring the user interface (e.g., UI 152) to map UI fields in reference to defining the one or more properties of each business object, which may include receiving user input selections in reference to defining the one or more properties of each business object.

The access manager 120 may include a data handler 122 configured to directly access, retrieve, and maintain the data used to determine and define the one or more properties of each business object. In some examples, the data may be stored and persisted in memory, such as in the computer-readable storage medium 112 and/or in the database 140. In some other examples, the data related to calculating the properties may be stored and persisted in memory, such as in the computer-readable storage medium 112 and/or in the database 140.

In an implementation, the one or more properties associated with each business object may include one or more static properties having a static value or static value association. In some examples, static properties may be modeled in a master data repository system (MDRS). In other examples, static properties may be accessible via a business object (BO) descriptor (e.g., metadata). In some other examples, non-final static properties may be overwritten by dynamic properties. In still other examples, final static properties may be referred to as independent and non-dynamic, wherein final static properties will never change and may never be changed.

In another implementation, the one or more properties associated with each business object comprise one or more dynamic properties having a dynamic value or a dynamic value association for deriving the property value. Dynamic properties may be determined at runtime for non-final static properties. Dynamic properties may be accessible via an interface, such as, for example, a service interface or proxy interface (e.g., Retrieve_Properties). Some of the properties that may be dynamically set may include one or more of node properties, node element properties (i.e., attribute properties), association properties, and action properties.

The access manager 120 may include a context handler 124 configured to define a context of one or more input parameters of data used to determine the one or more properties of each business object. In an example, the context may define a source of the data used to determine the one or more properties for each business object.

In various implementations, the one or more input parameters may include one or more local instance dependent parameters and/or one or more global instance independent parameters. In an example, definition of input parameters may be achieved on the business object (BO) node level with alias to thereby define a source of the data that determines the one or more properties of this particular node. In various examples, types of input parameters may include local (e.g., instance-dependent, such as an attribute of a same business object node or via association). In various other examples, types of input parameters may include global/static (e.g., instance-independent, such as Business Configuration, system variables such as system date and time, etc.).

The access manager 120 may include a rule handler 126 configured to define one or more rules associated with the one or more properties of each business object. In an example, the rules may define one or more attribute properties including at least one of an enabled attribute property, a read-only attribute property, and a mandatory attribute property. In another example, the rules may define one or more node properties including at least one of an enabled node property, an update enabled node property, a delete enabled node property, and a transient key node property. In another example, the rules may define one or more association properties including an enabled association property and a create enabled association property. In still another example, the rules may define one or more action properties including an enabled action property. These and other related aspects are further described herein.

The access manager 120 may include a model handler 128 configured to generate a metadata model 129 for each business object based on the context of the one or more input parameters of each business object and the one or more rules associated with the one or more properties of each business object. In an aspect of the disclosure, the properties of each business object may be modeled as dynamic properties based on the source of the data used to determine the properties for each business object and the rules associated with the properties of each business object. When modeled, the dynamic properties related to each business object provide for central improvements, maintenance, and reuse of each business property. Further, for each business object, relevant data may be directly fetched from memory and properties may be determined based on the directly fetched data without involving a service provider. In an example, the properties may be determined directly on the database/persistency.

The access manager 120 may include a runtime handler 130 configured to lock the one or more properties of each business object to each corresponding metadata model 129. In an example, the runtime handler 130 may be configured to handle lock dependent properties, for example, with no special modeling in decision tables. In some examples, maintenance of lock shadow in MDRS may already be available. Reuse of flag "read-only operation" should be checked (available for BO node and action), wherein even if the BO instance is not locked, the execution of this action or change of this node may be possible. For example, a print action may be executed even if another user locks a sales order.

In various examples, implementation of lock independent properties may provide for an instance where all data required for property calculation should be known by the framework. For example, data required for property calculation should be fetched (e.g., if not on database level) with other data. Data retrieval may not occur within the property calculation where additional data access may be withdrawn. A prerequisite may exist so that framework may be configured to handle property/sync notifications, wherein for example, these notifications may signal changes in properties or data to the service consumer. A service provider may not have to handle property notification. In another example, mass enablement in property interface may be required to allow fast calculation so as to avoid changing to returning values. In another example, there may be a possibility to retrieve properties only for dynamic values, and consideration of static properties may already be performed efficiently in UI framework.

The access manager 120 may include an extension handler 132 configured to redefine one or more properties for each business object. In an implementation, the extension handler 132 may be configured with a standard extension mechanism of MDRS to allow property (re)definition by one or more higher layers, such as, for example, globalization, solutions, partners, customers, etc. For instance, in various examples, one or more different layers may exist above each business object including one or more of a solution layer, a globalization layer, a partner layer, and a customer layer, and wherein each of the one or more different layers may be configured to extend or redefine one or more properties of each business object. In an implementation, the extension handler 132 may be configured with only simple plausibility checks against static properties during design time (e.g., a read-only-final attribute may not be set to 'Mandatory'), which may be the same for all layers. In some examples, runtime may have to merge property values following a principle that the most restrictive property value 'wins'.

The access manager 120 may include a property calculation handler 134 configured to map each property for each business object in memory (e.g., a metadata repository stored in the computer-readable storage medium 112 or the database 140) to at least one of the user interface (UI) fields in reference to defining the one or more properties associated with each business object. Optionally, the property calculation handler 134 may be configured to map each property for each business object in memory to a user selection event in reference to defining the one or more properties associated with each business object. In an aspect of the disclosure, since the properties of each business object are modeled based on the known source of data used for property determination, the property calculation may be determined based on the directly fetched data for each property of each business object without involving a service provider.

In an implementation, the property calculation handler 134 may be configured to map each property for each business object in memory (e.g., a metadata repository stored in the computer-readable storage medium 112 or a database 140) to a user selection element of the user interface (e.g., UI 152) for receiving the user input selections in reference to the UI fields and/or the user selection event for defining the one or more properties associated with each business object.

In some examples, data used for property calculation may include data related to a current lock mode, data related to a state of the business object, and/or data related to status action management (SAM). The business object data may include data related to attributes of a same node, data related to attributes of other nodes of a same instance, and/or data related to attributes of nodes of other instances. Each business object may include a structure having an existence of sub-nodes, such as, for example, to insure cardinality of 1 for a sub-node, wherein association create enabled=FALSE, if there is already a party of a certain kind. Each business object may include a handle for defaults. In other examples, data used for property calculation may include data related to Business Configuration Objects (BCO) and/or Business Processing Variant Time (BPVT), wherein for example, certain actions may only be allowed if a certain BPVT is active. In another example, the data used for property calculation may include data related to an enterprise service infrastructure (ESI) context, which may not be relevant for a user interface (UI) and may replace obsolete concept of weak property check. In another example, the data used for property calculation may include data related to system fields (e.g., SYLANGU: system logon language of the user or system date) or dates.

In some examples, the user interface (UI) may include a 'stateful' UI, such as, at least one of quick activity floorplan (QAF), an object instance floorplan, and a guided activity floorplan (GAF). The UI may include an object work list (OWL) with action enabled to simulate a lock without setting the lock. In another example, the UI may include a FactSheet with action enabled and element/node element enabled, which may be used by globalization. The business object (BO) may be configured to determine if action execution or modify is allowed.

Figure 2:
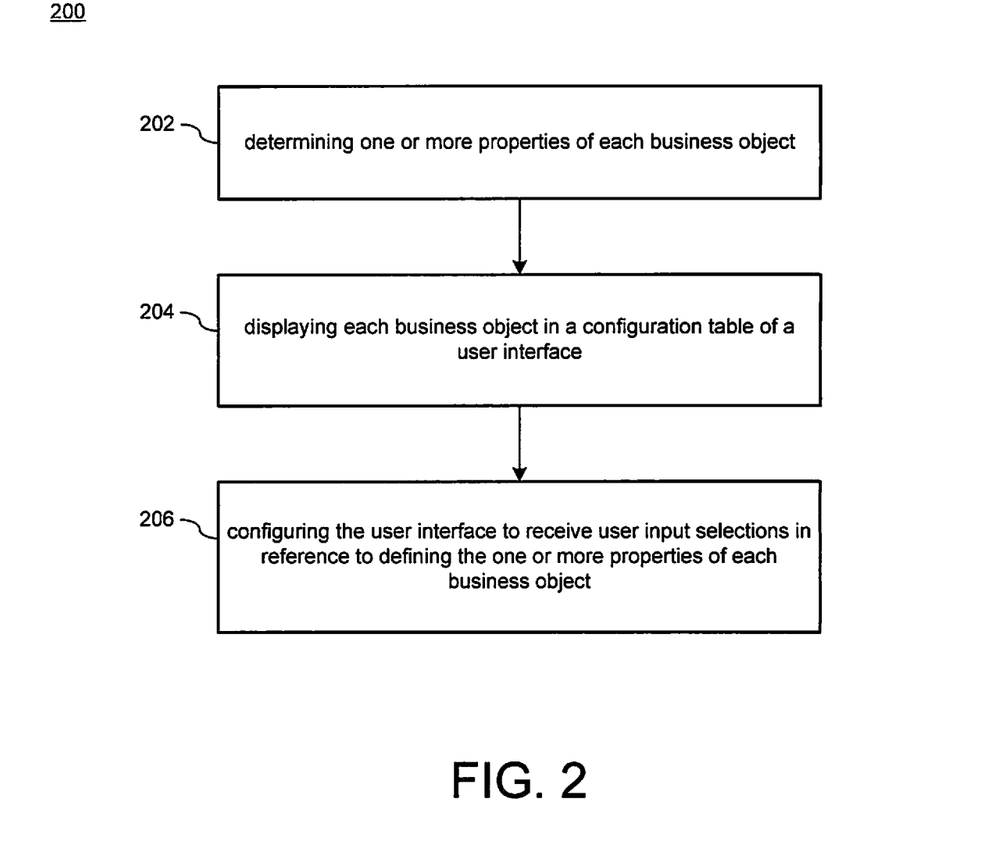
FIG. 2 is a process flow illustrating an example method for managing business objects, in accordance with aspects of the disclosure.

FIG. 2 is a process flow illustrating an example method 200 for managing business objects, in accordance with aspects of the disclosure. In the example of FIG. 2, operations 202-206 are illustrated as discrete operations occurring in sequential order. However, it should be appreciated that, in other implementations, two or more of the operations 202-206 may occur in a partially or completely overlapping or parallel manner, or in a nested or looped manner, or may occur in a different order than that shown. Further, additional operations, that may not be specifically illustrated in the example of FIG. 2, may also be included in some implementations, while, in other implementations, one or more of the operations 202-206 may be omitted.

In the example of FIG. 2, the method 200 may include a process flow for a computer-implemented method configured for managing business objects in the system 100 of FIG. 1. Further, as described herein, the operations 202-206 are configured to provide a simplified operational process flow that may be enacted by the computing device 104 to provide features and functionalities as described in reference to FIG. 1.

In the example of FIG. 2, at 202, the method 200 may include determining one or more properties of each business object. In an implementation, the one or more properties associated with each business object may include one or more static properties having a static value association. In another implementation, the one or more properties associated with each business object may include one or more dynamic properties having a dynamic value association for deriving the property value.

At 204, the method 200 may include displaying each business object in a configuration table of a user interface (e.g., the UI 152, such as a GUI). Some examples of displaying business objects in a UI configuration table are shown in FIGS. 5-8.

At 206, the method 200 may include configuring the user interface (e.g., UI 152) to map user interface (UI) fields in reference to defining one or more properties of each business object, which may include receiving user input selections in reference to defining the one or more properties of each business object. Some examples of receiving user input selections for defining properties of business objects in a UI configuration table are shown in FIGS. 5-8.

Figure 3:
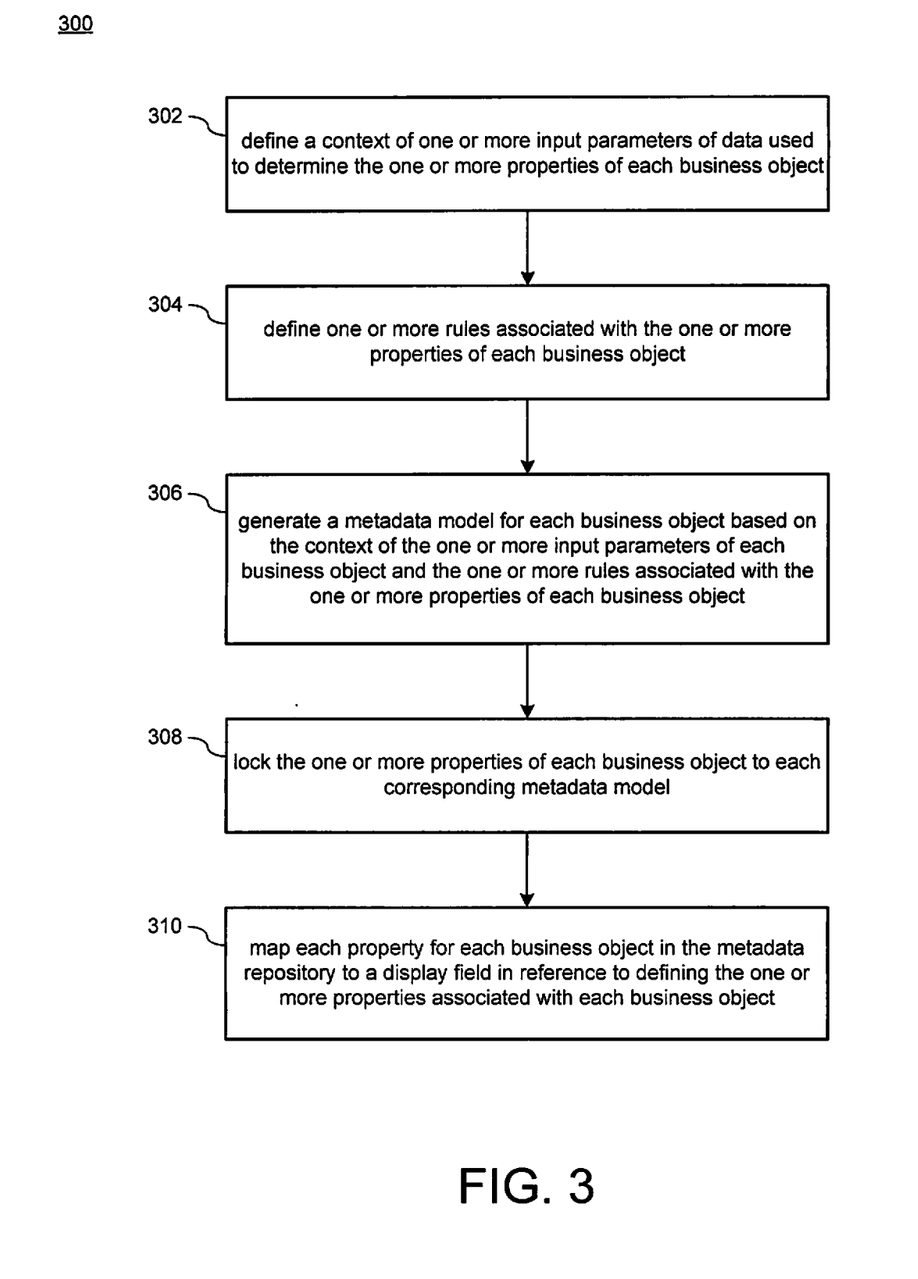
FIG. 3 is a process flow illustrating another example method for managing business objects, in accordance with aspects of the disclosure.

FIG. 3 is a process flow illustrating another example method 300 for managing business objects, in accordance with aspects of the disclosure. In the example of FIG. 3, operations 302-310 are illustrated as discrete operations occurring in sequential order. However, it should be appreciated that, in other implementations, two or more of the operations 302-310 may occur in a partially or completely overlapping or parallel manner, or in a nested or looped manner, or may occur in a different order than that shown. Further, additional operations, that may not be specifically illustrated in the example of FIG. 3, may also be included in some implementations, while, in other implementations, one or more of the operations 302-310 may be omitted.

In the example of FIG. 3, the method 300 may include a process flow for a computer-implemented method configured for managing business objects in the system 100 of FIG. 1. Further, as described herein, the operations 302-310 are configured to provide a simplified operational process flow that may be enacted by the computing device 104 to provide features and functionalities as described in reference to FIG. 1.

In various implementations, one or more of the operations 302-310 of the method 300 of FIG. 3 may be included as part of the process flow for the example method 200 of FIG. 2. Thus, one or more of the operations 302-310 of example method 300 may be implemented with one or more of the operations 202-206 of example method 200 to provide a simplified operational process flow that may be enacted by the computing device 104 to provide features and functionalities as described in reference to FIG. 1.

In the example of FIG. 3, at 302, the method 300 may include defining a context of one or more input parameters of data used to determine the one or more properties of each business object. The context may define a source of the data used to determine the one or more properties for each business object. In various examples, the input parameters may include one or more local instance dependent parameters and/or one or more global instance independent parameters.

At 304, the method 300 may include defining one or more rules associated with the one or more properties of each business object. In an implementation, the one or more rules define one or more attribute properties including at least one of a read-only attribute property, a mandatory attribute property, and an enabled attribute property. In another implementation, the one or more rules define one or more node properties including at least one of an update enabled node property and a delete enabled node property. In another implementation, the one or more rules define one or more association properties including a create enabled association property. In another implementation, the one or more rules define one or more action properties including an enabled action property.

At 306, the method 300 may include generating a metadata model for each business object based on the context of the one or more input parameters of each business object and the one or more rules associated with the one or more properties of each business object. In an example, the properties of each business object may be modeled as dynamic properties based on the source of the data used to determine the properties for each business object and the rules associated with the properties of each business object.

At 308, the method 300 may include locking the one or more properties of each business object to each corresponding metadata model. In an example, runtime may be configured to handle lock dependent properties. In other examples, implementation of lock independent properties may provide for an instance where data required for property calculation is known by the business object framework. For example, data required for property calculation may be fetched with other data.

At 310, the method 300 may include mapping each property for each business object in memory to a display field in reference to defining the one or more properties associated with each business object. In an example, each property may be mapped for each business object in memory to a display field of the user interface for mapping user interface (UI) fields in reference to defining the one or more properties associated with each business object. For instance, the properties may be mapped to a simple display field in the user interface (e.g., if enabled=false, then this display field is not shown in the user interface). In another optional example, each property may be mapped for each business object in memory to a user selection element of the user interface for receiving the user input selections in reference to the user selection event for defining the one or more properties associated with each business object.

In an implementation, the method 300 may further include directly accessing, retrieving, and maintaining the data used to determine and define the one or more properties of each business object. In another implementation, the method 300 may further include redefining one or more properties for each business object.

Figure 4:
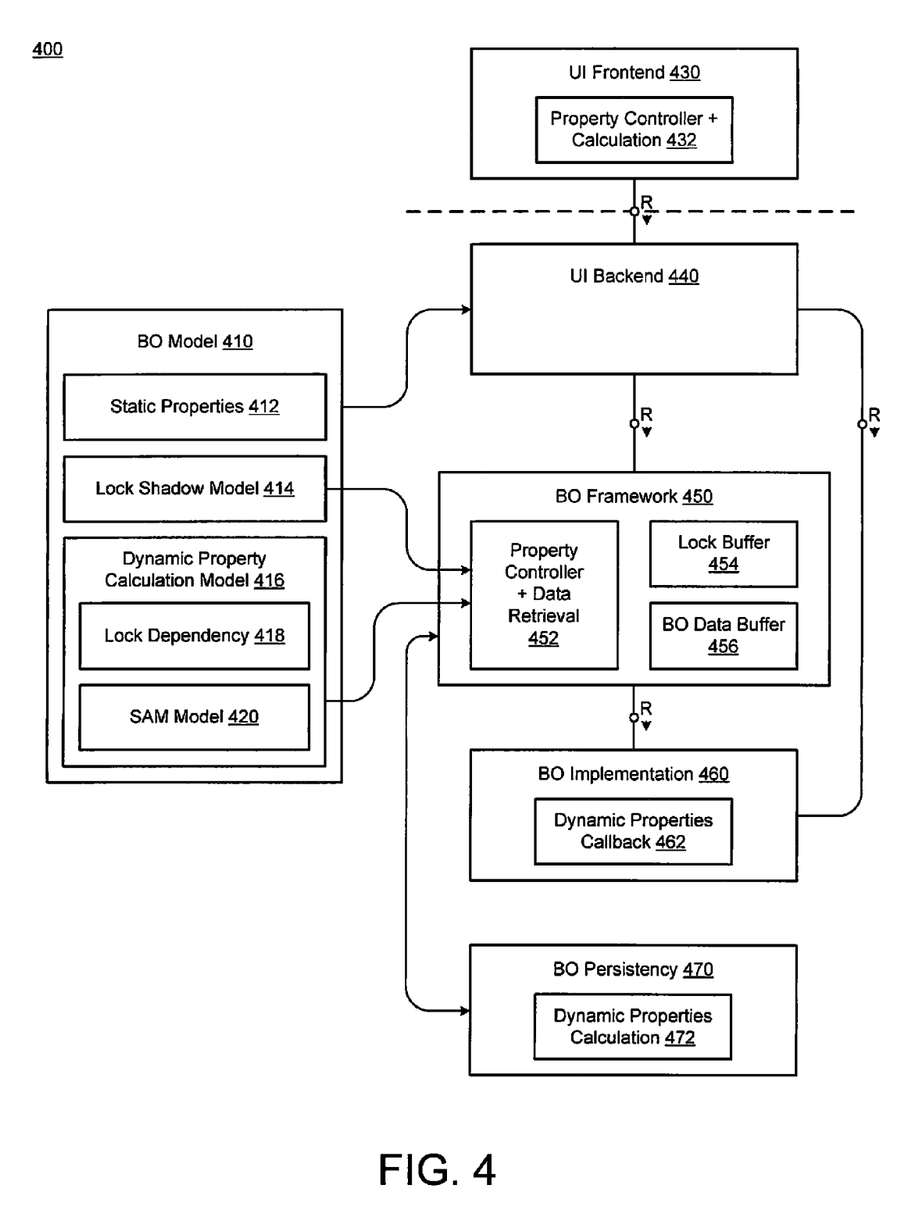
FIG. 4 shows an example property calculation process flow for managing business objects, in accordance with aspects of the disclosure.

FIG. 4 shows an example metadata model integration and an example property calculation process flow 400 for managing business objects, in accordance with aspects of the disclosure.

In the example of FIG. 4, a business object (BO) model 410 may include metadata describing a static BO model including static properties 412. The BO model 410 may further describe rules of how dynamic properties may be determined.

In the BO model 410, the static properties 412 may include a static part that defines their value, if no other dynamic information is provided. For example, a field may be read-only, if there is no other information provided during runtime. In this case, the static read-only property may be considered true. These static properties may be considered by consumers, like the UI, in advance (e.g., during compile time).

In the BO model 410, a lock shadow model 414 may be configured to define on which level the business object/document has a possibility to lock parts or the whole business object/document instance. In some instances, the whole document may be locked by a lock on a ROOT level. However, for large contracts, it may be possible to lock items of contract separately, that is, different employees may work simultaneously on the same document on different items.

In the BO model 410, a dynamic property calculation model 416 may be used to determine how the properties of the metadata model are derived (e.g., a definition of how to derive property values of the input parameters and the calculation model).

In the dynamic property calculation model 416, a lock dependency 418 includes a property that may depend on whether the user holds a lock for (parts of) a document or not. For example, if there is no lock, then fields may be considered read-only even if the business logic allows a change. In an example, a typical use case may be that another user already modifies the document. Then, the user may not get a lock, since the other user holds the lock for this document. In this case, the user sees the document as read-only, so the properties may depend on the lock status (e.g., whether the user locks the document or not).

Further, in the dynamic property calculation model 416, a status and action management (SAM) model 420 may include modeling of one or more possible actions in the business object/document, such as release or create follow-up and how the transitions of the status of the business object/document are done. For example, if the action release is used, then the status of the document may be changed from in process to released. In an example, this may be modeled in the SAM model 420.

In an implementation, a user interface (UI) frontend 430 may include a client running at user side, such as, for example, an internet browser, which includes a runtime for the dynamic property calculation rules defined in the BO model 410. In the UI frontend 430, a property controller+calculation 432 component may use a property calculation, if properties are computed in the UI frontend 430.

In an implementation, a UI backend 440 may be configured for processing a request of the UI frontend 430 and providing data and properties retrieved from business objects (e.g., either via a BO framework 450 or directly from a BO persistency 470). Dynamic properties are either retrieved from the BO framework 450 or calculated directly in the UI frontend 430 by the property controller+calculation 432, if the BO framework 450 may not be involved in a transaction (e.g., when the data is also not read via the BO framework 450, but directly from a database) or calculated on the database, if this is provided by the database.

In some examples, backend properties that may be evaluated by the UI framework may include one or more of attribute properties, node properties, association priorities, and action properties. The attribute properties may include one or more of read-only, mandatory, and enabled property. The node properties may include one or more of update enabled property (e.g., in case not, then all attributes may be set to read-only) and delete enabled property (e.g., for delete_row events in lists). The association properties may include at least a create enabled property (e.g., for add_row/add_child events in lists). The action properties may include at least an enabled property (e.g., to enable or disable a UI event).

In an implementation, the BO framework 450 may provide business object data to consumers, such as, for example, the user interface and/or other business object implementations. The BO framework 450 may be configured to retrieve the BO data and then stores the BO data and its changes in BO data buffer tables 456, which may be written back to the database upon executing a save instruction. The BO framework 450 may include a runtime for dynamic property calculation rules defined in the BO model 410. Thus, the BO framework 450 may provide dynamic properties for business objects.

In the BO framework 450, a property controller+data retrieval component 452 may use a property calculation, if the properties are computed in the BO framework 450. Further, in the BO framework 450, a lock buffer 454 may be configured to hold the locks of the user in the current session. For example, the user may simultaneously edit a sales order and a business partner. Then, the lock buffer 454 may include two entries with the corresponding keys. Still further, in the BO framework 450, a BO data buffer 456: the data buffer, that is basically the sales order 3432 and the business partner data 343 in the example above (items, financial data etc.)

In an implementation, a BO implementation 460 may be configured to provide actual business logic of a business object as far as it is implemented and may not be modeled in the BO model 410. The BO implementation 460 may include dynamic property callbacks as implementation of dynamic property determination, which may not be modeled, but must be implemented due to complexity or limitation of modeling.

In the BO implementation 460, a dynamic properties callback 462 may be configured to exit the implementation using a programming language (e.g., ABAP), if the modeling capabilities are not considered sufficient, and code may have to be written to calculate the property values based on the input parameters for the BO implementation 460. In some examples, this may be only the lender of last resort, wherein modeling should normally be sufficient.

In an implementation, the BO persistency 470 may include database persistency of the business object data. The database may provide a dynamic properties calculation 472 that may be based on dynamic property calculation rules of the BO model 410, which may be interpreted and/or implemented on the database in analogy to the BO implementation 460. In the BO persistency 470, a dynamic properties calculation 472 may be configured to provide a property calculation, if properties in the persistency (database) are computed. In an example, one or more of the properties may be calculated based on a property model in the user interface (UI) layer 430. In another example, one or more of the properties may be calculated based on a property model stored in memory, such as in the computer-readable medium 112 and/or the database 140.

In an implementation, the user may launch the UI frontend 430 to request data and properties from the UI backend 440. The UI backend 44 may transform the frontend request to requests to the BO framework 450. The BO framework 450 may access the metadata model (e.g., this may be buffered for improved runtime) and may fetch the data corresponding to the request from the database/persistency 470. The BO framework 450 may determine dynamic properties based on the business object data, configuration data, and/or other parameters, such as login language. The business logic may be implemented in the BO implementation 460, which may be called by the BO framework 450 (e.g., particular in case of modifications or actions by the user). The BO framework 450 may return data and properties to the UI backend 440, which serializes the data and properties to the UI frontend 430 for display.

Figure 5:
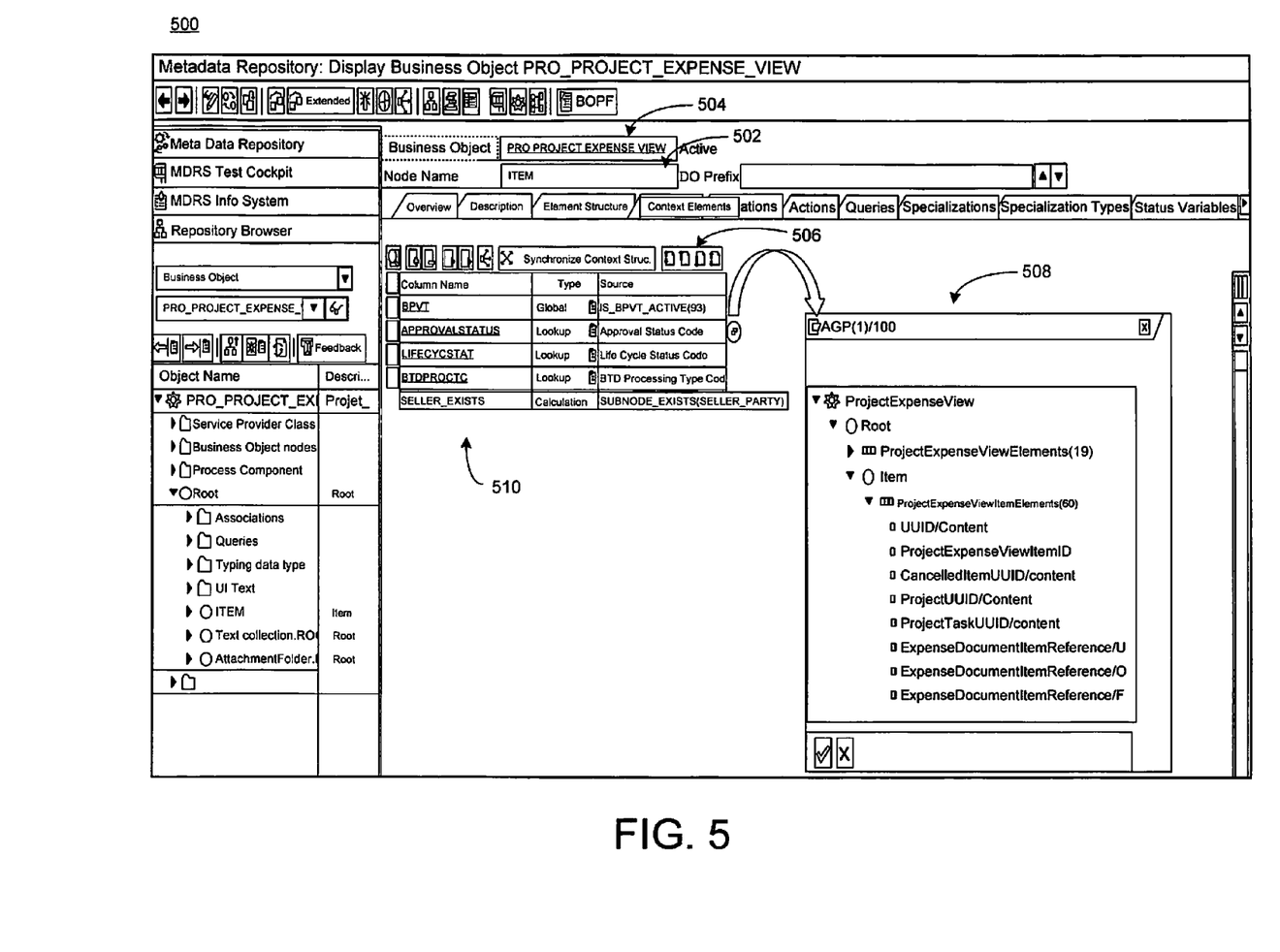
FIG. 5 shows an example screenshot of input parameter definition, in accordance with aspects of the disclosure.

FIG. 5 shows an example screenshot 500 of input parameter (context) definition in a UI configuration table, in accordance with aspects of the disclosure.

In the example of FIG. 5, definition of input parameters may be achieved on the business object (BO) node level with alias to thereby define a source of the data that determines the one or more properties of this particular node. In various examples, types of input parameters may include local (e.g., instance-dependent, such as an attribute of a same business object node or via association). In various other examples, types of input parameters may include global/static (e.g., instance-independent, such as Business Configuration, SY-variables, etc.).

In this example, the context data required for property calculation of the node "ITEM" 502 of the business object "PRO_PROJECT_EXPENSE_VIEW" 504 is defined. As shown, five input parameters 506 may already be defined. The first may be a global one that is not dependent on the concrete project expense view instance, but the general configuration setting "BusinessProcessVariantType" (BPVT). The next three are bound to attributes, which are reachable via associations from the node ITEM 502. Which associations have to be followed, may be selected in the pop-up 508, as shown in FIG. 5. In this instance, the user may browse in this pop-up 508 via association to the data it requires as context for property calculation. The last example "SELLER_EXISTS" 510 represents an exit implementation, that is "Calculation", since determining this data exceeds the modeling possibilities. Therefore, an exit implementation may be called to determine, if the subnode "SELLER_PARTY" exists.

Figure 6:
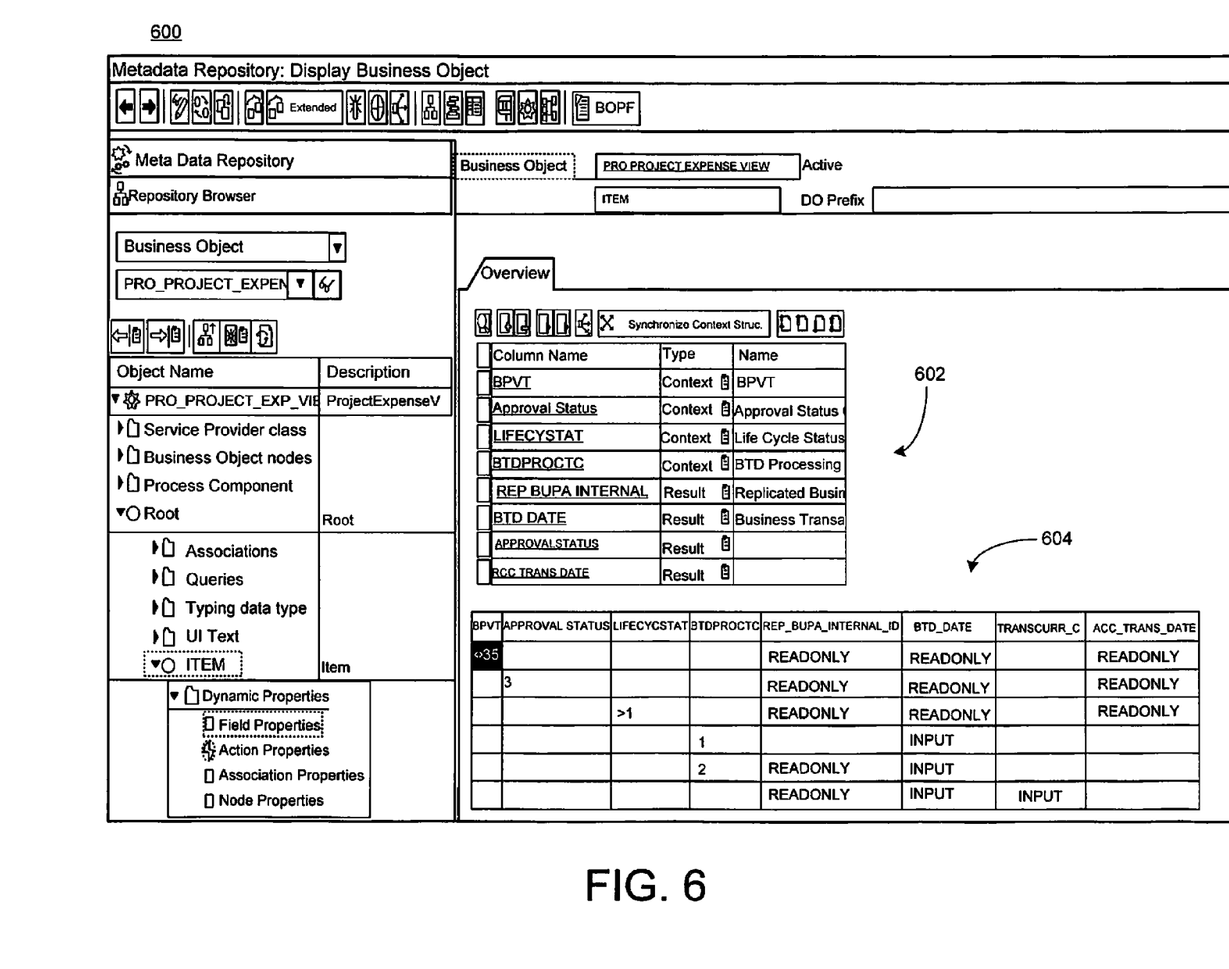
FIG. 6 shows an example screenshot of rule definition, in accordance with aspects of the disclosure.

FIG. 6 shows an example screenshot 600 of rule definition in a UI configuration table, in accordance with aspects of the disclosure.

In the example of FIG. 6, definition of rules may be achieved with a decision table per business object (BO) node and property type. In some examples, a decision table appears to provide a flexible and usable format with at least one maintenance option, wherein other maintenance options could be added. In various other examples, a separate decision table may be provide per business object (BO) node and property type (e.g., node, attributes, actions, and associations).

In an example, the context parameters may be repeated in the first table 602 on the right hand side redundantly for the developer, which may be omitted in other implementations of the metadata repository. The rules may be defined in the second table 604 on the bottom. In this example, if the BPVT is <=35, then the attributes REP_BUPA_INTERNAL_ID, BTD_DATE, and ACC_TRANS_DATE are having the property read-only=true. This may also be the case, if the APPROVALSTATUS of the document has a value of 3. If BTDPROCTC of the document is 2, then REP_BUPA_INTERNAL_ID is read-only and BTD_DATE is input enabled. Note that the most restrictive property "wins" for an attribute, node, association, or action, if multiple of the conditions are fulfilled simultaneously.

Figure 7:
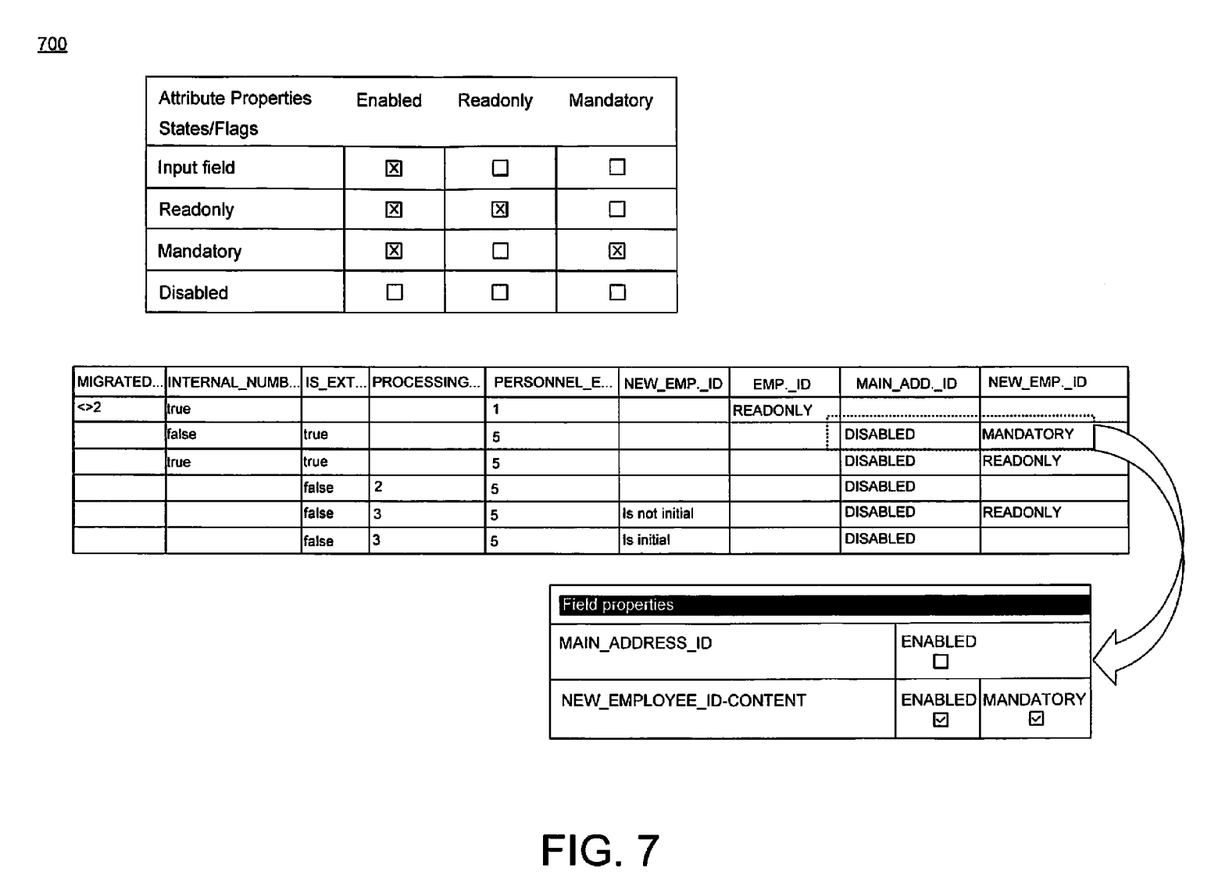
FIG. 7 shows an example screenshot of property format of rule definition, in accordance with aspects of the disclosure.

FIG. 7 shows an example screenshot of a property format of a rule definition in a UI configuration table 700, in accordance with aspects of the disclosure.

In the example of FIG. 7, property values may be maintained and stored as code values in the UI configuration table 700. For the developer, it may be helpful to expose certain combination of properties by "aggregates". For example, the user interface in FIG. 6 does not expose separate maintenance fields for the three attribute properties "Enabled", "Read Only", and "Mandatory", which may be all three either true or false. Not all combinations are meaningful, but only four of them as described in FIG. 7. Abbreviations "Input Field", "Read Only", "Mandatory", and "Disabled" have been introduced for these combinations, which may then be used for the maintenance of decision tables, as given in the example of FIG. 6.

Figure 8:
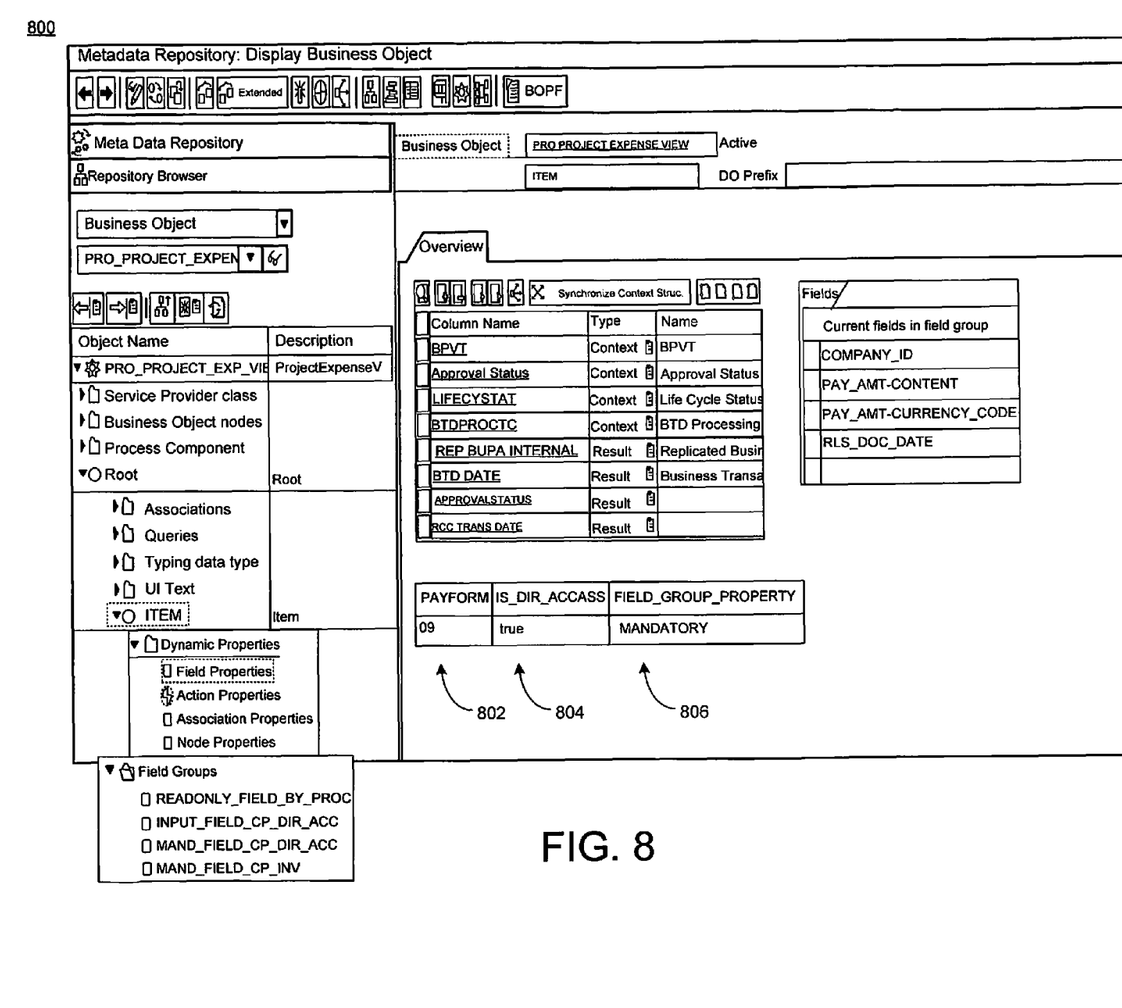
FIG. 8 shows an example screenshot of another rule definition for groups, in accordance with aspects of the disclosure.

FIG. 8 shows an example screenshot 800 of another rule definition for groups in a UI configuration table, in accordance with aspects of the disclosure.

In the example of FIG. 8, the rule definitions may be configured to allow property groups or groupings, wherein a property group may include attributes, actions, associations, and/or nodes of an entire business object (BO). In some examples, a check may be needed, wherein only entities of those nodes may be part of the group that is able to reach all input parameters. In this example, a field group with four attributes has been created. If the input data PAYFORM 802 is 9, and the IS_DIR_ACCESS 804 is true, then the field group property 806 and, therefore, all four attributes get the property combination MANDATORY (that is properties enabled=true, readonly=false, mandatory=true, as shown in FIG. 7).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for user interaction, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user may provide input to the computer. Other types of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user may interact with an implementation, or any combination of such back-end, middleware, or front-end components. Components may be interconnected by any form or medium of digital data communication, e.g., a communication network. Examples of networks, such as communication networks, may include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system including instructions recorded on a non-transitory computer-readable medium and executable by at least one processor, the system comprising:
    an access manager configured to cause the at least one processor to manage business objects in memory by determining one or more properties of each business object, displaying each business object in a configuration table of a user interface, and configuring the user interface to map user interface fields in reference to defining the one or more properties of each business object, wherein the access manager includes:
        a context handler configured to define a context of one or more input parameters of data used to determine the one or more properties of each business object;
        a rule handler configured to define one or more rules associated with the one or more properties of each business object;
        a model handler configured to generate a metadata model for each business object based on the context of the one or more input parameters of each business object and the one or more rules associated with the one or more properties of each business object;
        a runtime handler configured to lock the one or more properties of each business object to each corresponding metadata model; and
        a property calculation handler configured to map each property for each business object in memory to at least one of the user interface fields in reference to defining the one or more properties associated with each business object.

2. The system of claim 1, wherein the access manager further comprises a data handler configured to directly access, retrieve, and maintain the data used to determine and define the one or more properties of each business object.

3. The system of claim 1, wherein the context defines a source of the data used to determine the one or more properties for each business object.

4. The system of claim 1, wherein the one or more input parameters include one or more instance dependent parameters.

5. The system of claim 1, wherein the one or more input parameters include one or more global independent parameters.

6. The system of claim 1, wherein:
    the access manager is further configured to cause the at least one processor to manage business objects in memory by configuring the user interface to receive user input selections in reference to defining the one or more properties of each business object, and
    the property calculation handler is further configured to map each property for each business object in memory to a user selection event in reference to defining the one or more properties associated with each business object.

7. The system of claim 1, wherein the one or more rules define one or more attribute properties including at least one of a read-only attribute property, a mandatory attribute property, and an enabled attribute property.

8. The system of claim 1, wherein the one or more rules define one or more node properties including at least one of an update enabled node property and a delete enabled node property.

9. The system of claim 1, wherein the one or more rules define one or more association properties including a create enabled association property.

10. The system of claim 1, wherein the one or more rules define one or more action properties including an enabled action property.

11. The system of claim 1, wherein the access manager further comprises an extension handler configured to redefine one or more properties for each business object.

12. The system of claim 1, wherein one or more of the properties are calculated based on a property model in the user interface.

13. The system of claim 1, wherein one or more of the properties are calculated based on a property model stored in memory.

14. The system of claim 1, wherein one or more different layers exist above each business object including one or more of a solution layer, a globalization layer, a partner layer, and a customer layer, and wherein each of the one or more different layers are configured to extend or redefine one or more properties of each business object.

15. The system of claim 1, wherein the one or more properties associated with each business object comprise one or more static properties having a static value association.

16. The system of claim 1, wherein the one or more properties associated with each business object comprise one or more dynamic properties having a dynamic value association for deriving the property value.

17. The system of claim 1, wherein the property calculation handler is configured to map each property for each business object in memory to a user selection element of the user interface for receiving the user input selections in reference to the user selection event for defining the one or more properties associated with each business object.

18. A computer-implemented method for managing business objects in memory, comprising:
    determining one or more properties of each business object;
    displaying each business object in a configuration table of a user interface; and
    configuring the user interface to map user interface fields in reference to defining the one or more properties of each business object,
    wherein the method further comprises:
        defining a context of one or more input parameters of data used to determine the one or more properties of each business object;
        defining one or more rules associated with the one or more properties of each business object;
        generating a metadata model for each business object based on the context of the one or more input parameters of each business object and the one or more rules associated with the one or more properties of each business object;
        locking the one or more properties of each business object to each corresponding metadata model; and
        mapping each property for each business object in memory to at least one of the user interface fields in reference to defining the one or more properties associated with each business object.

19. The method of claim 18, further comprising:
    directly accessing, retrieving, and maintaining the data used to determine and define the one or more properties of each business object.

20. The method of claim 18, wherein the one or more properties associated with each business object comprise one or more static properties having a static value association.

21. The method of claim 18, wherein the one or more properties associated with each business object comprise one or more dynamic properties having a dynamic value association for deriving the property value.

22. A computer program product, the computer program product being tangibly embodied on a non-transitory computer-readable medium and comprising instructions that, when executed by at least one processor, are configured to:
    manage business objects in memory by determining one or more properties of each business object, displaying each business object in a configuration table of a user interface, and configuring the user interface to map user interface fields in reference to defining the one or more properties of each business object, wherein the instructions, when executed by the at least one processor, are further configured to:
    define a context of one or more input parameters of data used to determine the one or more properties of each business object;
    define one or more rules associated with the one or more properties of each business object;
    generate a metadata model for each business object based on the context of the one or more input parameters of each business object and the one or more rules associated with the one or more properties of each business object;
    lock the one or more properties of each business object to each corresponding metadata model; and
    map each property for each business object in memory to at least one of the user interface fields in reference to defining the one or more properties associated with each business object.

23. The computer program product of claim 22, wherein the one or more properties associated with each business object comprise one or more static properties having a static value association.

24. The computer program product of claim 22, wherein the one or more properties associated with each business object comprise one or more dynamic properties having a dynamic value association for deriving the property value.

* * * * *